US 6,652,153 B2

(12) United States Patent
Bates, III et al.

(10) Patent No.: US 6,652,153 B2
(45) Date of Patent: Nov. 25, 2003

(54) HIGH DENSITY FIBER OPTIC CONNECTOR WITH INDIVIDUAL FIBER REMOVAL

(75) Inventors: Charles Linsday Bates, III, Laguna Hills, CA (US); Peter Joseph Hyzin, Trabuco Canyon, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 194 days.

(21) Appl. No.: 10/004,967

(22) Filed: Dec. 7, 2001

(65) Prior Publication Data

US 2003/0108301 A1 Jun. 12, 2003

(51) Int. Cl.$^7$ ................................................ G02B 6/38
(52) U.S. Cl. ............................................................ 385/59
(58) Field of Search ................................ 385/59, 54, 53, 385/58, 60, 25, 89

(56) References Cited

U.S. PATENT DOCUMENTS

| | | |
|---|---|---|
| 3,209,302 A | 9/1965 | Uberbacher |
| 4,895,425 A | 1/1990 | Iwano et al. ................ 350/96.2 |
| 4,906,197 A | 3/1990 | Noll ............................ 439/79 |
| 5,133,032 A | 7/1992 | Salter et al. .................. 385/60 |
| 5,216,732 A | 6/1993 | Knott .......................... 385/59 |
| 5,306,159 A | 4/1994 | Noll et al. ..................... 439/61 |
| 5,497,444 A | 3/1996 | Wheeler ...................... 385/135 |
| 5,555,332 A | 9/1996 | Dean et al. .................... 385/53 |
| 5,600,747 A | 2/1997 | Yamakawa et al. ........... 385/59 |
| 5,930,425 A | 7/1999 | Abel et al. .................... 385/53 |
| 6,069,992 A | 5/2000 | Hyzin .......................... 385/55 |
| 6,238,099 B1 | 5/2001 | Le Guen et al. .............. 385/59 |

FOREIGN PATENT DOCUMENTS

| | | |
|---|---|---|
| EP | 0 927 896 A1 | 7/1999 |
| FR | 0 766 111 A1 | 4/1997 |
| WO | WO 01/40839 A1 | 6/2001 |

*Primary Examiner*—Javaid H. Nasri
(74) *Attorney, Agent, or Firm*—Roger C. Turner, Esq.

(57) ABSTRACT

An optical fiber connector system includes a rear connector (16) comprising a main rear shell (50) with a plurality of ports (52) and a plurality of rear module bodies (54) each lying in one of the ports. A plurality of backshells (84) extend rearwardly from the rear of the module bodies, with the jackets of multiple fiber cables stripped at a location within each backshell to leave free individual optical fiber devices that extend into passages of the module. Each backshell has a pair of backshell passages (162) that each holds a backshell fastener (172) that fastens the backshell to a module body, each backshell fastener having a wrench-receiving passage (192). Jackscrews (150) fasten each module body to the shell, and each backshell has a wrench-receiving passage (192) extending along its length for passing a wrench to screw in and unscrew a jackscrew.

18 Claims, 6 Drawing Sheets

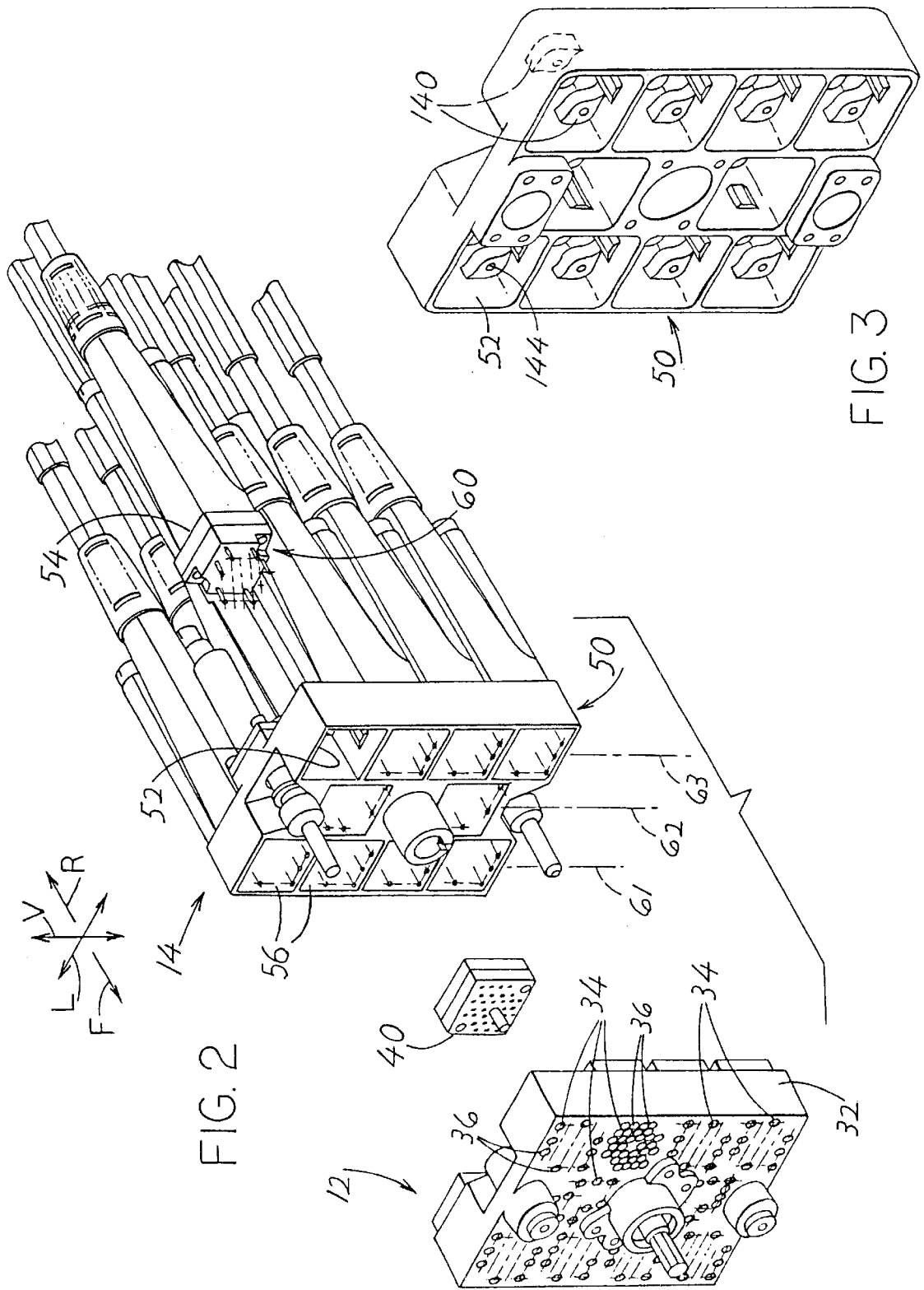

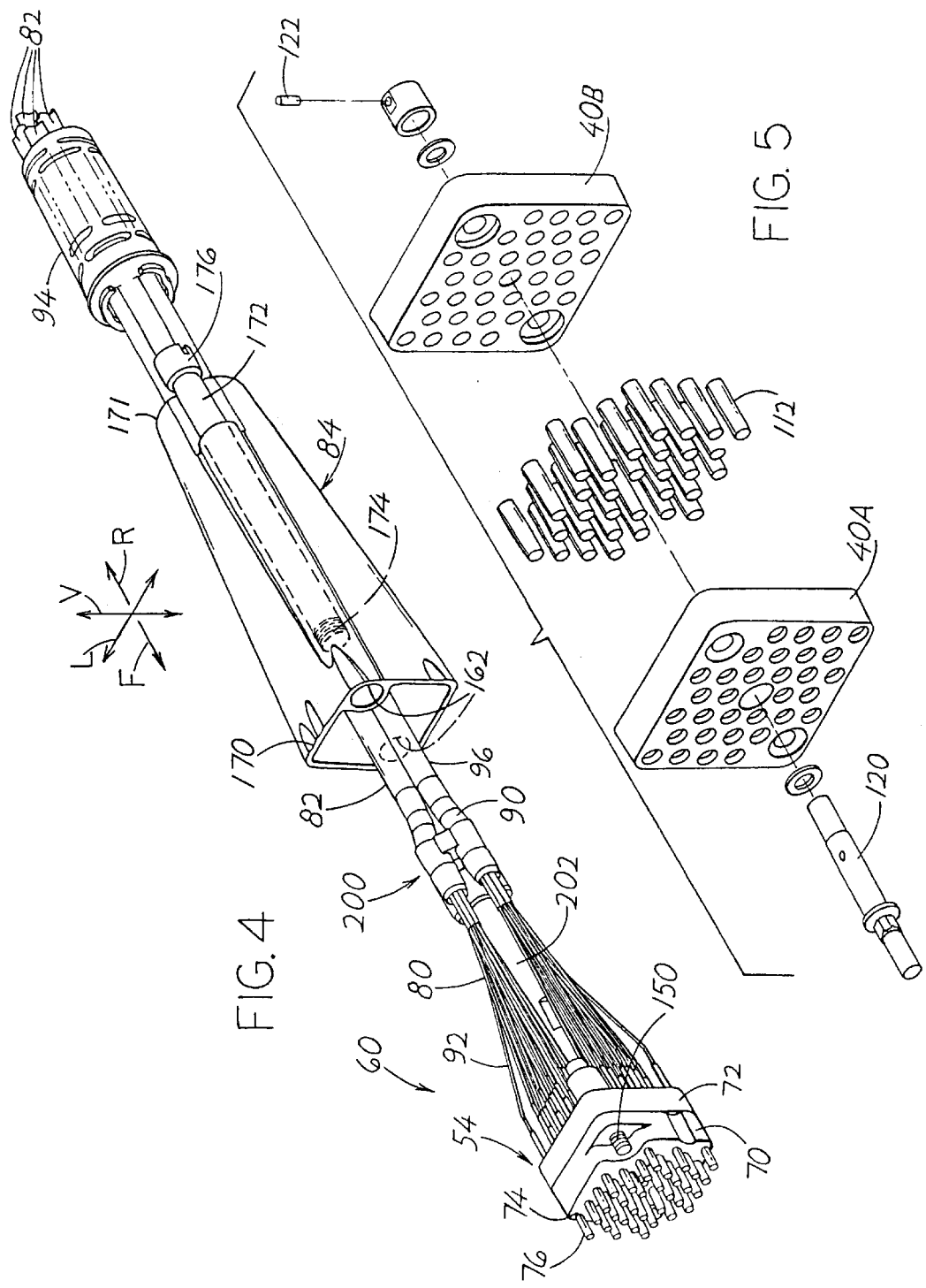

HIGH DENSITY FIBER OPTIC CONNECTOR WITH INDIVIDUAL FIBER REMOVAL

BACKGROUND OF THE INVENTION

There is a need for high capacity and high density optical fiber connectors that facilitate maintenance of a single optical fiber assembly without disrupting communications through of all the other optical fiber assemblies. For example, there are requests for connector systems with hundreds of fiber assemblies to fit within eight inches square of space on a panel, the system being composed of separate modules of thirty-two fibers each. Such assembly must allow a single fiber assembly to be removed for cleaning or other maintenance and repair without disrupting communications through the other hundreds of optical fibers. A system which was very compact but still allowed individual fiber maintenance would be of value.

SUMMARY OF THE INVENTION

In accordance with one embodiment of the present invention, applicant provides an optical fiber connector system of a type that has individual alignment sleeves and loading springs for each pair of coupled optical fiber assemblies for efficient light coupling. The system organizes the fibers and cables extending from each of a plurality of modules to enable easy access to an individual optical fiber assembly. Each rear module includes a module body and a backshell extending rearwardly from the module body. Optical fiber cables that each includes a plurality of optical fibers, have jackets with jacket front ends lying within the backshell. Free optical fiber portions extending forward at the jackets and within the front of the backshell, extend into passages in the rear module body. Each backshell has a rectangular front end and each backshell has a pair of fastener-receiving backshell passages at opposite corners. A pair of backshell fasteners extends through each backshell passage, each fastener having a front end that is detachably connected to the rear body of the module.

The modules are arranged in a plurality of rows and columns in corresponding ports of a main rear shell. Each port receives one of the module bodies and has a pair of internal flanges for receiving jackscrews.

Jackscrews that fasten each module body to the rear shell, are aligned with the backshell fasteners. The backshell fasteners have wrench-receiving passages extending along their axes, so a wrench can pass through a backshell fastener to turn a jackscrew.

A cable holder has a rear end that lies within the backshell and that holds the front ends of the optical cables where the individual cables are unwrapped from the cable jackets. The cable holder has a post that extends forwardly and is coupled to the module housing to fix the positions of the cable front ends. This facilitates removal of an individual optical fiber assembly from a passage of the module housing.

The novel features of the invention are set forth with particularity in the appended claims. The invention will be best understood from the following description when read in conjunction with the accompanying drawings.

BRIEF DESCRIPTION OF THE DRAWINGS

FIG. 2 is a partially exploded front isometric view of the connector system of FIG. 1, showing the front and rear connectors, showing an individual alignment sleeve frame detached from the front connector, and showing a rear module detached from the rear main shell.

FIG. 3 is a front isometric view of the main rear shell of the rear connector of FIG. 2.

FIG. 4 is an exploded front isometric view of one the rear modules of the rear connector of FIG. 2, with the backshell slid rearwardly from its fully installed position.

FIG. 5 is an exploded front isometric view of the alignment sleeve frame and sleeves of the connector system FIG. 2.

DESCRIPTION OF THE PREFERRED EMBODIMENTS

Figure 1:
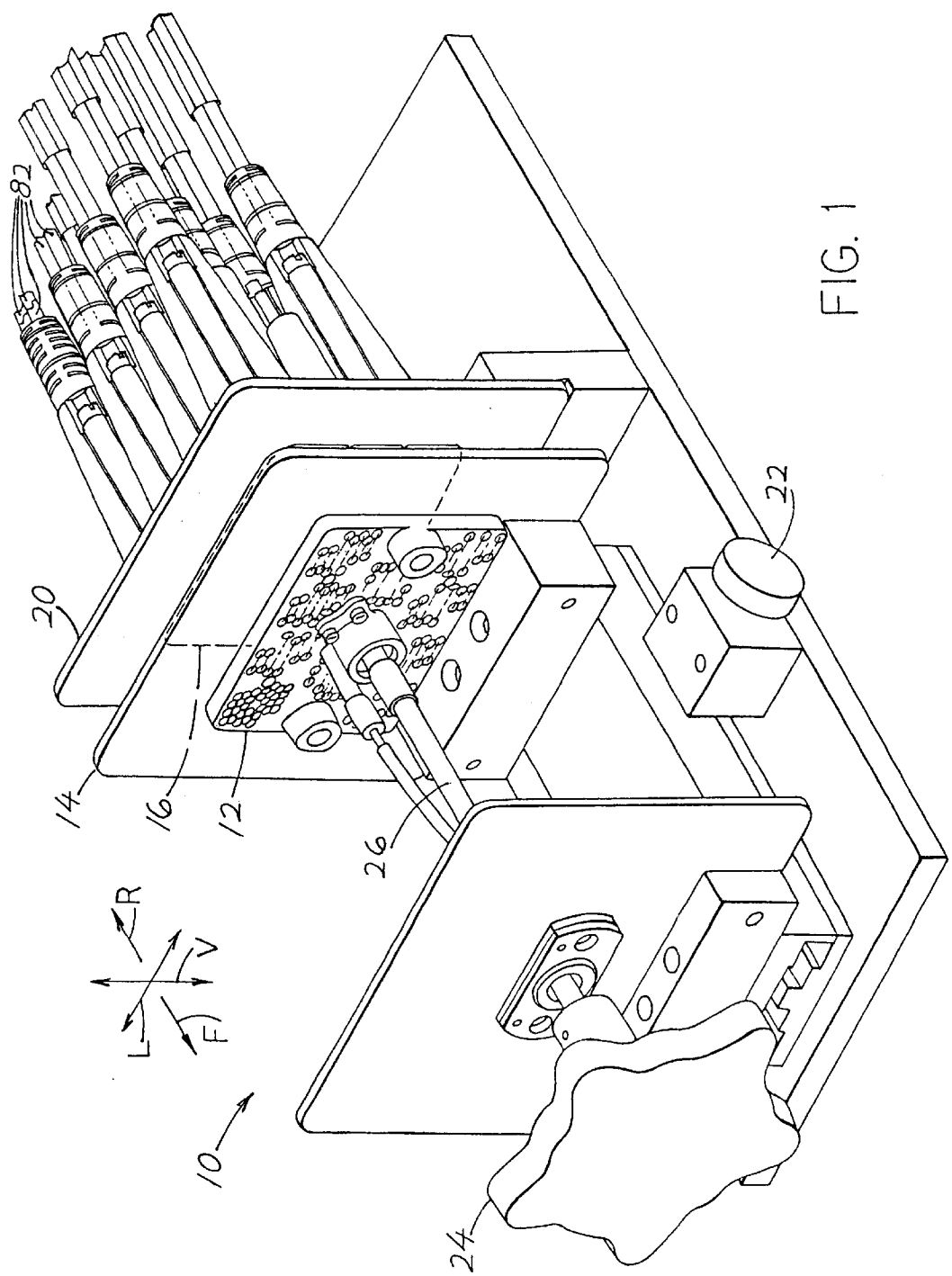
FIG. 1 is a front isometric view of an optical fiber connector system of the present invention.

FIG. 1 shows an optical fiber connector system 10 which has a small profile in lateral L and vertical V directions, such as eight inches by eight inches, and yet which efficiently couples three hundred twenty optical fibers. Rear optical fiber cables 82 are shown but front optical fiber cable are not shown. The system includes a receptacle or front connector 12 mounted on a drawer or rack plate 16 and a plug or rear conneotor 14 mounted on a panel 20. With a drawer lock 22 fixing the drawer, a handle 24 can be turned to turn a main jackscrew 26 that draws the connectors 12, 14 close together. As the connectors move together, the tips of optical fibers of the two connectors move together until the tips abut to couple the optical fibers (if the tips do not already abut).

FIG. 2 shows the two connectors 12, 14. The front connector 12 includes a front shell and body apparatus 32 that includes ten modules regions 34. Each module region includes thirty-two passages 36 that each receives an optical fiber coupling assembly. Ten sleeve-holding frames 40 each holds thirty-two alignment sleeves, and is installed on the front shell and body apparatus 32. The rear connector 14 includes a main rear shell 50 that has a plurality of module-receiving ports 52. Each port 52 receives part of, and preferably most of, the module body 54 of a rear module 60. The rear connector includes ten module regions 56 occupied by ten rear modules 60 arranged in three vertically V extending columns 61–63 and a plurality of lateral L extending rows. There are four modules in each side column 61, 63 and two modules in the middle column 62. FIG. 3 shows details of the main rear shell SO and of its ports 52.

FIG. 4 shows that the rear module body 54 includes a front plate 70 and a back plate 72. The plates form laterally L extending rows and vertically V extending columns, of passages 74. Each passage holds an optical fiber coupling assembly 76. Thirty-two optical fibers 80 extend rearwardly from the thirty-two passages. It is noted that each optical fiber 80 actually includes a thin optical fiber element with a cladding around it and usually with a protective covering. The optical fibers emerge from four optical cables 82 that each holds eight optical fibers. A backshell 84 surrounds the front ends 90 of the four optical cables and surrounds free optical fiber portions 92 that are not surrounded by the jackets 96 of the cables and that lie behind the module body. The free optical fiber portions 92 extend from the cable front ends 90 to the rear module body 54. The length of the free fiber portions 92 is preferably at least half the length of the backshell 84. At the rear end of the backshell, a cable bend relief 94 that is attached to the backshell, provides strain relief for the four optical cables 82. The backshell longitudinal length is preferably more than four time the module body length.

Figure 6:
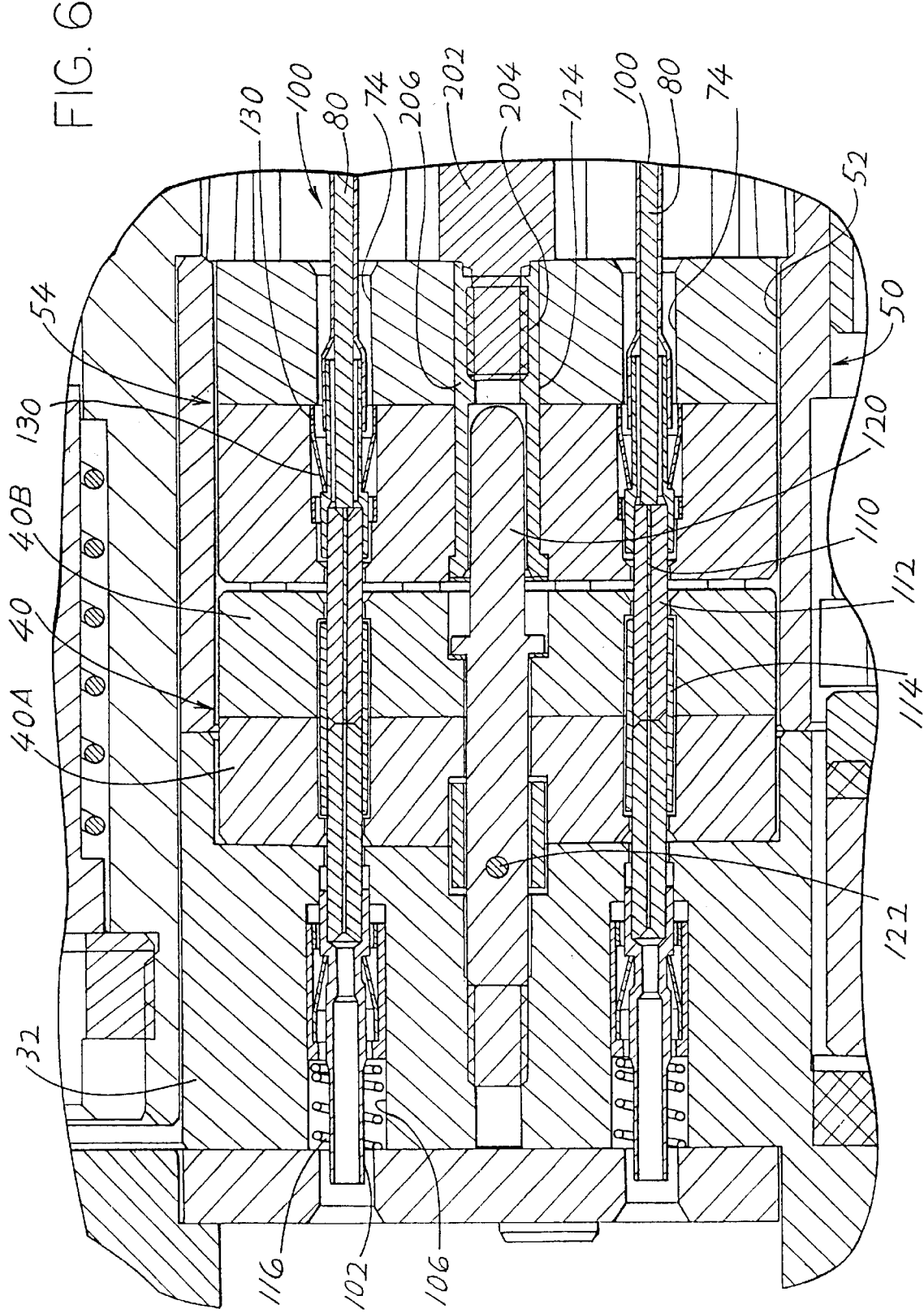
FIG. 6 is a partial sectional view of the connectors of FIG. 2 shown fully mated.

FIG. 6 shows a pair of optical fiber coupling assemblies 100, 102 that lie in passages 74, 106 of the rear and front connectors. Each rear coupling assembly 100 includes an optical fiber 80 with the front end 110 of the fiber extending through a ferrule 112. The front tip of the fiber front end 110 abuts the front tip of the fiber of the front optical fiber coupling assembly 102 of the front connector. Ceramic alignment sleeves 114 precisely align the two ferrules, while a spring 116 of the rear connector urges the fiber tips to firmly abut one another. The alignment sleeves are held in the sleeve frame 40 which includes two sleeve frame plates 40A, 40B.

An alignment post 120 is fastened by a locking pin 122 to the front connector shell apparatus 32. A rear portion of the post projects into an alignment sleeve member 124 in the rear module body 54. The body 54 lies one of the ports 52 of the main rear shell 50.

An individual rear optical fiber coupling assembly 100 can be removed by inserting a tool through the passage 74 to expand a retaining clip 130. Such tool is in the form of a cylinder with a slot along its length to receive the optical fiber. The optical fiber coupling assembly 100 is then removed by merely pulling rearwardly on the optical fiber 80 while the tool is in place.

As shown in FIG. 3, the main rear shell 50 has a pair of internal flange parts 140 projecting into each of its ports 52. Each internal flange part has a threaded hole 144. FIG. 4 shows that each rear module 60 includes a pair jackscrews 150 with threaded front ends that can screw into one of the threaded holes of the main rear shell to hold the rear module body 54 securely in a corresponding main rear shell port. The jackscrew threads can be bayonet type threads.

Figure 7:
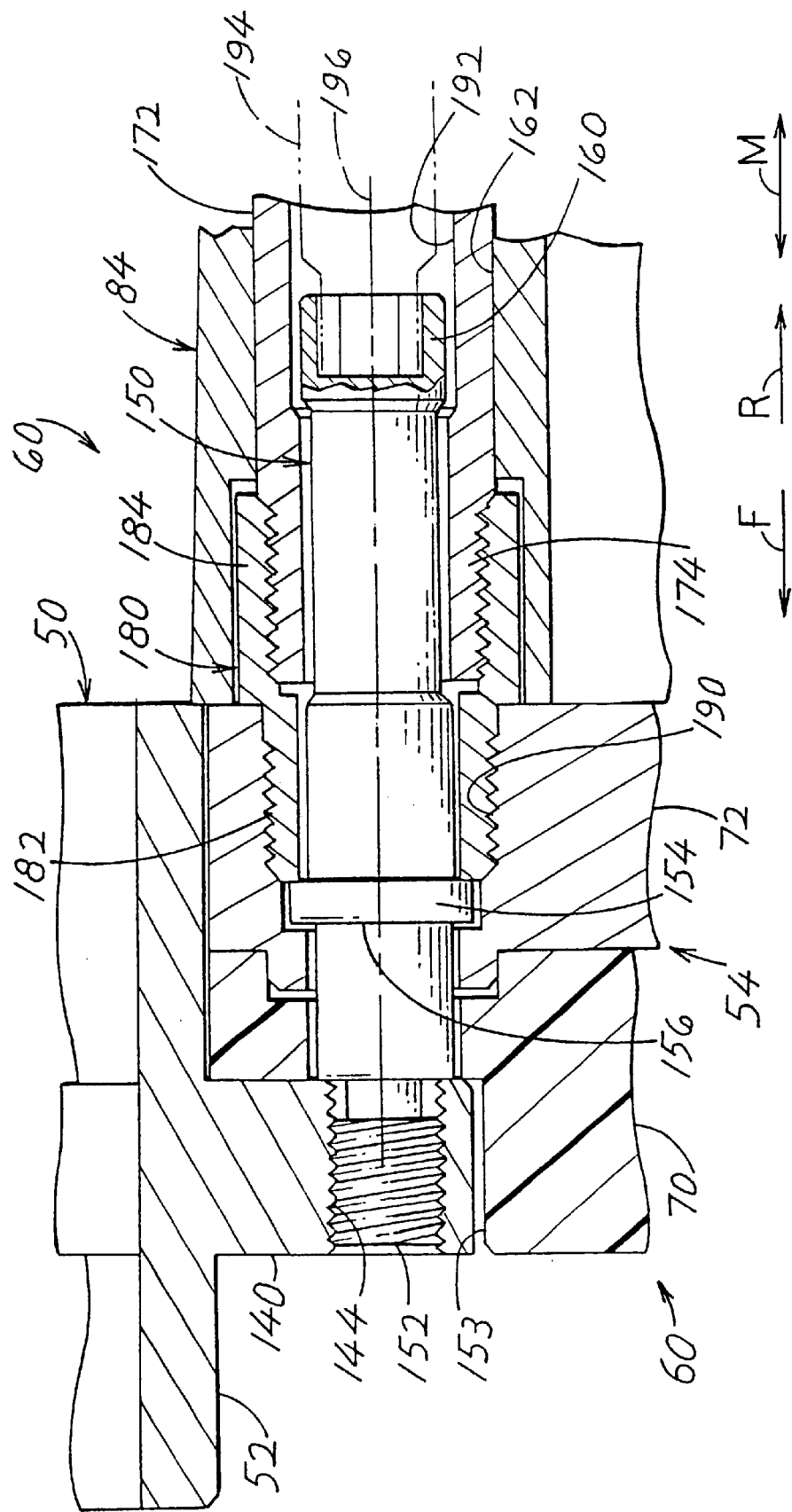
FIG. 7 is a sectional view showing a corner region of the rear module of FIG. 4, and also showing its connection to the main rear shell of FIG. 3

FIG. 7 shows one of the jackscrews 150 with its threaded front end 152 screwed into a threaded hole 144 of an internal flange part 140 that lies +in a port 52 of the main rear shell 50. The module body 54 has a cutout 153 that receives the internal flange part 140. The jackscrew has an external flange 154 forming a forwardly-facing shoulder 156 that abuts a corresponding shoulder of the backplate 72 of the rear module body 54. The backplate 72 presses the front plate 70 against the internal flange 140. The jackscrew has a wrench-engaging rear end 160 for turning the jackscrew to loosen it or tighten it. The particular wrench-engaging end 160 includes a hexagonal cavity, but can include a hexagonal outside or other wrench-engagable shape. The backshell 84 has a fastener-receiving passage 162 that is aligned with the jackscrew 150.

FIG. 4 shows that the backshell 84 has a largely rectangular front end 170 and a largely circular rear end 171, and that the backshell has a pair of backshell passages 162 at its opposite corners and extending along much of its length. A pair of backshell fasteners 172 lie in the backshell passages 162 and serve to hold the backshell front end 170 against the rear module body 54. Each backshell fastener 172 has a front end 174 that is threaded. Each backshell fastener has a rear end 176 that has a noncircular surface such as a slot for turning by a screwdriver.

Referring again to FIG. 7, it can be seen that the rear module includes a coupling sleeve 180 with an externally threaded front end 182 and an internally threaded rear end 184. The sleeve 180 may be considered part of the rear module body. The sleeve front end 182 is threadably engaged with a threaded hole 190 in the backplate 72 of the rear module body. The sleeve rear end 184 is threadably engaged with the threaded end 174 of the backshell fastener 172. The backshell fastener has a wrench-receiving passage 192 that can receive a wrench indicated at 194, for turning the rear end 160 of the jackscrew. The jackscrew 150 and backshell fastener 172 are aligned, preferably with their axes 198 aligned in a longitudinal M direction. It is possible to use a very short backscrew whose rear end lies forward of the backshell fastener front end instead of within it.

If it is desired to remove an entire rear module 60, this can be accomplished using the wrench 194 to turn the jackscrew 150 so as to move the rear module body 54 rearwardly. In practice, each of the two jackscrews that hold the module body in a port of the main rear shell 50, is unscrewed by perhaps one-half turn at a time to move the rear module rearwardly with minimum tilting that could damage the thirty-two optical coupling assemblies lying in passages of the rear module body. The backshell 84 with the thirty-two optical fibers will all be removed as a unit. FIG. 2 shows one of the rear modules 60 removed so another rear module can be substituted for it.

In many cases, it is desirable to remove a single optical fiber coupling assembly 100 (FIG. 6). This may occur, for example, if less than the usual percent of light is being transmitted between a pair of front and rear optical fiber coupling assemblies. By removing only a single coupling assembly, applicant needs to switch only the limited number of communication channels carried through one optical fiber coupling assembly, to another coupling assembly that is providing as a spare. If an entire module had to be removed every time a defect was detected in one of the thirty-two optical fiber coupling assemblies, then thirty-two times as many channels would have to be switched.

In order to remove a single optical fiber coupling assembly 100, applicant first removes the backshell 84 (FIG. 7). Applicant accomplishes this by unscrewing the two backshell fasteners 172 from the corresponding coupling sleeve rear ends 184. This results in a configuration such as shown in FIG. 4, where the free portions 92 of the individual optical fibers 80 are accessible. As discussed above, a technician inserts a tool within the retention clip 130 (FIG. 6) and pulls on the optical fiber 80 to remove it from the module body. In many cases, a poor optical fiber connection can be returned to an initial high level by cleaning the tips of the fibers and ferrules. The tip of the removed optical fiber is readily accessible for cleaning. The tip of the front fiber can be cleaned by a special tool that is moved along the corresponding rear module body passage 74 and against the ferrule and optical fiber tip of the front optical fiber assembly 102. During all of this time, the thirty-one other optical coupling assemblies 100 in the module continue to function.

Figure 8:
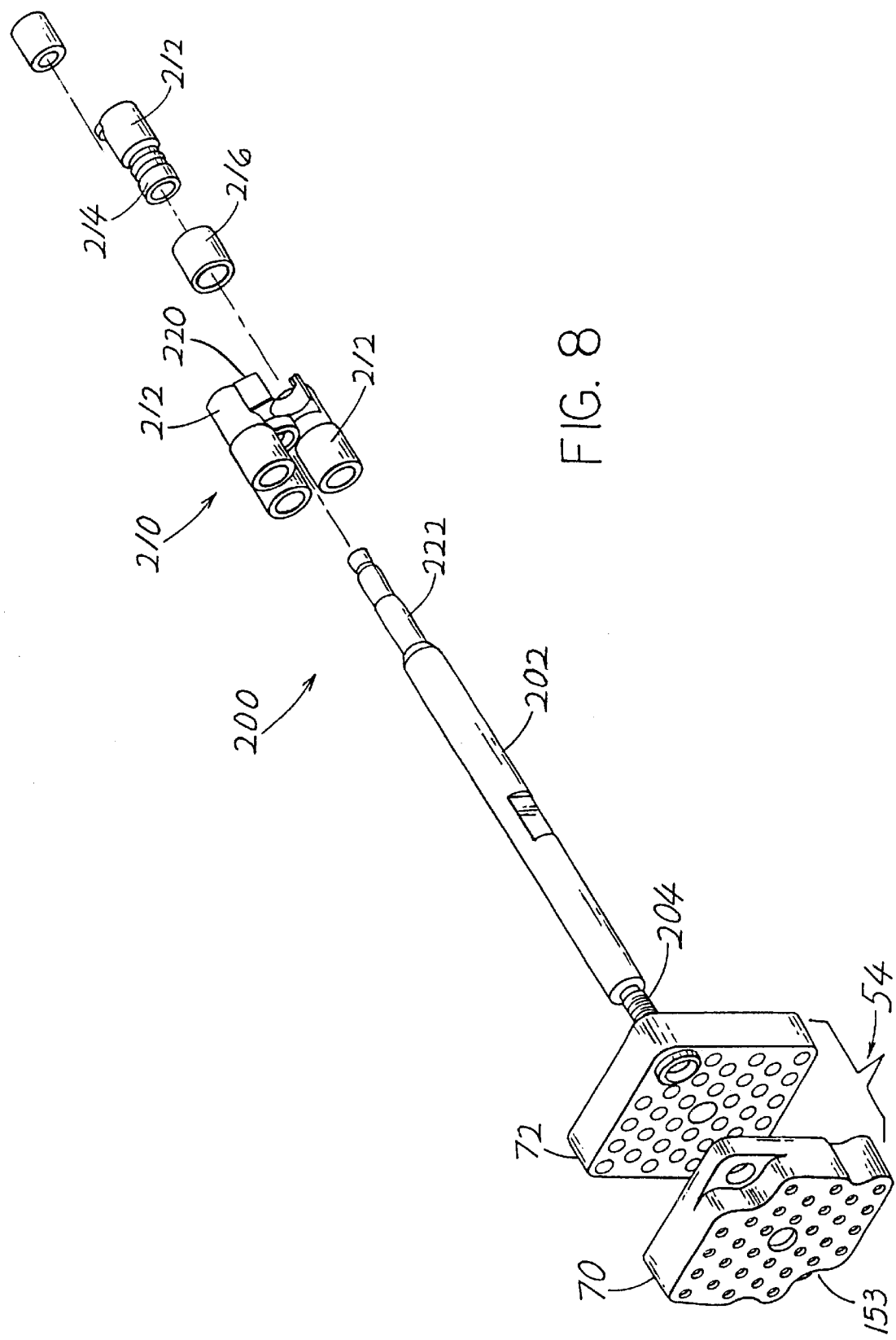
FIG. 8 is an exploded front isometric view of the cable holder of FIG. 4.

FIG. 4 shows that the four optical cables 82 are held and connected together by a cable holder 200. The cable holder has a post 202 that extends forwardly and that has a front end threadably engaged with the rear module body 54. FIG. 6 shows the front end 204 of the cable holder post threadably engaged with an internally threaded rear end 206 of the alignment sleeve 124. The post 202 of FIG. 4 fixes the distance of the cable front ends 90 (FIG. 4), from the module body 54 to provide a neat arrangement of the optical fibers free portions 92. This facilitates access to a selected one of the thirty-two optical fibers 80 and the corresponding ferrules for removal and cleaning. The cable holder transfers rearward forces applied to cable jackets, directly to the module body. The cable holder is preferably not fixed to the backshell and lies completely within the backshell. FIG. 8 shows that the cable holder 200 includes a crimp section 210 that includes four crimp sleeves 212. The jacket of each of the four optical cables is wrapped backward around a front end 214 of each sleeve, a crimp ring 216 is placed around the jacket and sleeve front end 214, and the crimp ring 216 is crimped to securely hold to the jacket of each optical cable. The four crimp sleeves 212 lie in a positioner 220 that has a hole that receives the rear end 222 of the post 202. A removable strap (not shown) is wrapped around the four sleeves to hold them in place.

Thus, the invention provides an optical fiber connector system with front and rear connectors that each has a plurality of module regions for holding multiple optical fiber coupling devices. The rear connector includes a rear main shell with a plurality of module receiving ports that each forms part of one of the module regions. A plurality of rear modules each has a rear module body that fits into one of the ports of the main rear shell. The ports of the main rear shell are arranged in a plurality of rows and columns, with a plurality of ports in each row and each column. The walls of each port include a pair of internal flange parts having threaded holes. Each rear module includes a pair of jackscrews that each has a threaded front end that threadably engages one of the flange parts. A backshell extends behind each rear module body to enclose the optical fiber cable or cables and the free optical fiber portions that extend from front ends of the cables where the jackets have been stripped away. Each backshell has a pair of backshell passages that each receives a backshell fastener that fastens to the rear module body. Each backshell fastener is aligned with one of the jackscrews, to reduce the amount of space occupied by both of them, to provide more space for the multiple optical fiber coupling assemblies. Each backshell fastener has a wrench-receiving passage extending along its length, through which a wrench can be inserted to loosen a jackscrew without requiring the backshell to be removed (which could result in damage to the optical fibers during jackscrew turning). A cable holder which lies primarily within the backshell, has a rear end attached to the optical fiber cables and a front end that is fixed to the module body. As a result, opposite ends of the free portions of the optical fibers are fixed to provide a neat arrangement of multiple optical fibers that facilitates removal and replacement of one optical fiber.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector system that includes longitudinally spaced front and rear connectors that each has multiple passages for holding multiple optical fiber coupling assemblies wherein:

said rear connector includes a first rear module that includes a rear module body having a plurality of passages for receiving a plurality of said optical fiber contact assemblies, said first rear module including a longitudinally-elongate; backshell that has a front end lying adjacent to said rear module body, said optical fiber contact assemblies including optical fibers lying within said first backshell;

said first backshell has a pair of fastener-receiving backshell passages;

a pair of backshell fasteners extending through said backshell passages, each backshell fastener having a front end that is detachably connected to said rear module body and each backshell fastener having a rear end that can be manipulated from a location adjacent to the rear of the corresponding passage to detach the backshell from the rear module body.

2. The system described in claim 1 wherein:

said rear connector Includes a main rear shell that has passage walls forming a plurality of module-receiving ports that each opens rearwardly;

said rear connector includes a plurality of module bodies, including said first rear module body, said module bodies each lying in one of said ports;

a plurality of pairs of module fasteners that each fastens one of said module bodies to said main rear shell.

3. The system described in claim 2 wherein:

said backshell fasteners each has a longitudinally-extending wrench-receiving passage;

each of said module fasteners has a threaded front end threadably coupled to said rear shell and has a rear end lying in line with one of said wrench-receiving passages.

4. The system described in claim 2 including:

a coupling sleeve which has a front portion with an external thread and a rear portion with an internal thread, said sleeve front portion surrounding one of said module fasteners and directly threadably engaged with said first module body, and said sleeve rear portion surrounding and threadably engaged with the front end of one of said backshell fasteners.

5. The system described in claim 1 wherein:

said first backshell has a front end with an outside surface of rectangular shape, said front end having internal wall forming said fastener-receiving passages at diagonally opposite sides of said rectangular shape.

6. An optical fiber connector system which includes front and rear connectors lying one longitudinally behind the other wherein each connector has a plurality of modules regions that each has a plurality of fiber-receiving passages for each holding an optical fiber coupling assembly, wherein:

said rear connector includes a main rear shell that has a plurality of module receiving ports that each opens rearwardly and that each forms one of said module regions;

said main rear shell having a pair of internal flange parts lying in each port, each flange part having a flange threaded hole;

said rear connector includes a plurality of rear modules that each includes a rear module body with a plurality of said fiber-receiving passages and with a pair of fastener receiving holes, said fastener receiving holes being aligned with the pair of flange threaded holes of a corresponding one of said ports;

said rear connector includes a pair of jackscrews that each lies in one of said fastener receiving hole 8 of one of said module bodies each jackscrew having a threaded front end threadably engaged with one of said flange threaded holes, and each jackscrew having a forwardly-facing shoulder that abuts one of said rear module bodies to prevent rearward removal of the module body from a corresponding module receiving port, each jackscrew having a rearwardly-facing wrench-receiving surface for turning by a wrench to remove and tighten the jackscrew.

7. The system described in claim 6 wherein:
each of said jackscrews has an external flange spaced rearward of its threaded front end;
each of said rear module bodies includes a threaded hole part that is part of one of said fastener receiving holes, and a coupling sleeve that has an externally threaded front part that is threadably engaged with one of said threaded hole parts;
said coupling sleeve substantially abuts the external flange of one of said jackscrews, and said sleeve has an internally threaded rear part;
said rear connector includes a plurality of backshells that each surrounds optical fibers of the optical fiber coupling assemblies that lie in the passages of one of said rear modules;
said rear connector includes a fastener that abuts one of said backshells and is threadably fastened to the threaded rear part of one of said coupling sleeves.

8. The system described in claim 6 wherein said rear connector includes:
a plurality of backshells that each surrounds optical fibers of the optical fiber coupling assemblies that lie in the passages of one of said modules;
a pair of longitudinally-elongated backshell fasteners that each abuts one of said backshells to prevent rearward movement of the backshell, and that each has a front end coupled to one of said rear module bodies, each jackscrew being longitudinally-elongated and each backshell fastener being aligned with one of said jackscrews.

9. The system described in claim 6 wherein said rear connector includes:
a plurality longitudinally-elongated backshells that each surrounds optical fibers of the optical fiber coupling assemblies that lie in the passages of one of said rear modules, each backshell having a front end fastened to one of said rear module bodies and each backshell having a rear end;
a plurality of cables that each includes a plurality of optical fibers and a jacket lying around said optical fibers;
said jacket of each cable is stripped off from around said optical fibers at a location within one of said backshells which is closer to the rear end of the backshell than to the front end.

10. The system described in claim 6 wherein said rear connector includes:
a plurality longitudinally-elongated backshells that each surrounds optical fibers of the optical fiber coupling assemblies that lie in the passages of one of said modules, each backshell having a front end fastened to one of said rear module bodies and each backshell having a rear end;
a plurality of cables that each includes a plurality of optical fibers and a jacket lying around said optical fibers;
said jacket of each cable is stripped off from around said optical fibers at a location within one of said backshells; and including
a cable coupling that lies at least partially within said backshell and that holds said cables together at said location, said cable coupling being fixed to a corresponding one of said rear module bodies.

11. The system described in claim 6 wherein:
each of said rear module bodies has parallel top and bottom horizontal sides and parallel laterally-spaced vertical sides that extend perpendicular to said top and bottom sides and that join to said top and bottom sides at corners;
said rear module body has a front end portion with cutouts at a pair of said corners, said internal flange parts lying in said cutouts.

12. An optical fiber connector system which includes front and rear connectors lying one longitudinally behind the other wherein each connector has a plurality of fiber-receiving passages for holding optical fiber coupling assemblies, wherein:
said rear connector includes a rear shell that has a plurality of module receiving ports that each opens rearwardly, and said rear connector includes a plurality of modules that each includes a module body with a plurality of fiber-receiving passages and a backshell that has a backshell front end lying at a rear end of the rear module body and a backshell rear end;
a pair of module fasteners that each fastens one of said module bodies to said rear shell, and a pair of backshell fasteners that each fastens one of said backshells to a corresponding one of said module bodies;
each of said backshell fasteners being longitudinally aligned with one of said module fasteners.

13. The system described in claim 12 wherein:
said rear shell has a pair of internal flanges in each of said ports, said internal flanges each having a threaded hole, each of said module bodies has a cutout that receives one of said internal flanges, and said module fasteners each comprises a jackscrew that has a front end threadably engaged with one of said threaded holes.

14. The system described in claim 12 wherein:
said backshell fasteners each has a longitudinally-extending wrench-receiving passage, and each of said module fasteners has a wrench-receiving rear end that lies in line with one of said wrench-receiving passages.

15. The system described in claim 12 including:
a sleeve with an externally threaded front end and an internally threaded rear end, said sleeve forming a forwardly-facing sleeve shoulder and one of said module fasteners forming a forwardly-facing shoulder for abutting a corresponding one of said module bodies and forming a rearwardly facing shoulder abutting said forwardly-facing sleeve shoulder;
one of said backshell fasteners has an externally threaded front end that is threadably engaged with said sleeve threaded rear end.

16. An optical fiber connector comprising:
a body element that has a plurality of fiber-receiving passages;
a backshell that has a backshell front end lying at a rear end of said body element and that has a backshell rear end;
at least one optical fiber cable which has a jacket and a plurality of optical fibers, said jacket has a front end lying within said backshell and said optical fibers having free portions extending between said jacket front ends and said body element, said fibers each extending into one of said passages;
a cable holder that has a rear end that is fixed to said jacket front end, said cable holder having a post extending forwardly from a cable holder front end and fixed to said body element.

17. The connector described in claim 16 wherein:

said connector includes a main shell with a plurality of ports and a plurality of module bodies that includes said body element, that each lies in one of said ports, each module body having a plurality of fiber-receiving passages;

said at least one optical fiber cable includes a plurality of cables each having a plurality of fibers with front ends lying in passages of the same module body;

said cable coupling connects together the front ends of all cables whose optical fibers have front ends lying in passages of the same module.

18. The connector described in claim 16 wherein:

said post holds said cable jacket front end spaced behind said body a distance more than twice a longitudinal length of said body.

* * * * *